G. SJOLANDER.
COMBINED BUMPER AND LIFTING JACK FOR MOTOR VEHICLES.
APPLICATION FILED SEPT. 20, 1919.

1,326,795.

Patented Dec. 30, 1919.
2 SHEETS—SHEET 1.

Witnesses
Fred L. Fox,

Inventor
G. Sjolander.
By Victor J. Evans.
Attorney

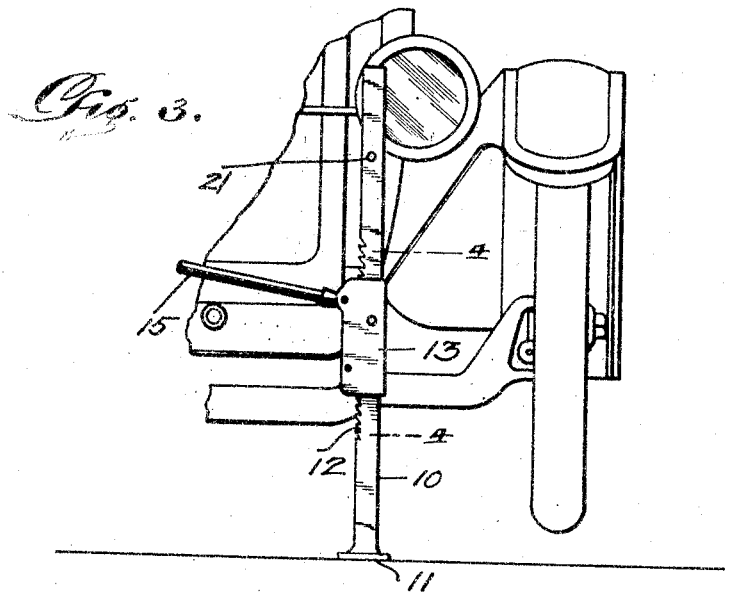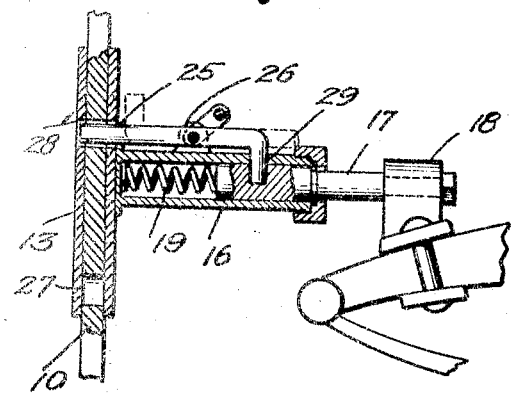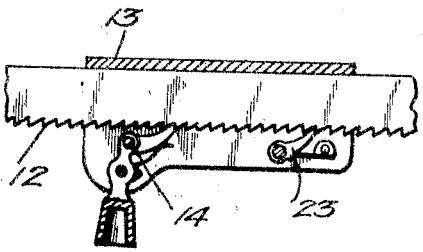

UNITED STATES PATENT OFFICE.

GUSTAF SJOLANDER, OF MIDLAND, MICHIGAN.

COMBINED BUMPER AND LIFTING-JACK FOR MOTOR-VEHICLES.

1,326,795.

Specification of Letters Patent.  Patented Dec. 30, 1919.

Application filed September 20, 1919. Serial No. 325,125.

*To all whom it may concern:*

Be it known that I, GUSTAF SJOLANDER, a citizen of the United States, residing at Midland, in the county of Midland and State of Michigan, have invented new and useful Improvements in Combined Bumpers and Lifting-Jacks for Motor-Vehicles, of which the following is a specification.

This invention comprehends the provision of a combined bumper and lifting jack for motor vehicles, and embodies among other features a pair of detachably connected sections arranged horizontally for use as a bumper, and associated with the frame or axle of the car in a manner to permit each section to be swung to a vertical position to serve as a jack.

In carrying out the invention I provide means for locking each section in a vertical position with a view of preventing theft of the car, or use of the same by unauthorized persons.

The nature and advantages of the invention will be better understood when the following detail description is taken in connection with the accompanying drawings, the invention residing in the construction, combination and arrangement of parts as claimed.

In the drawings forming part of this specification like numerals of reference indicate similar parts in the several views and wherein:—

Fig. 3 is a fragmentary view of a motor vehicle showing the invention used as a jack.

Fig. 4 is a sectional view taken on line 4—4 of Fig. 2.

Fig. 5 is a sectional view through one of the jacks.

Figure 1:
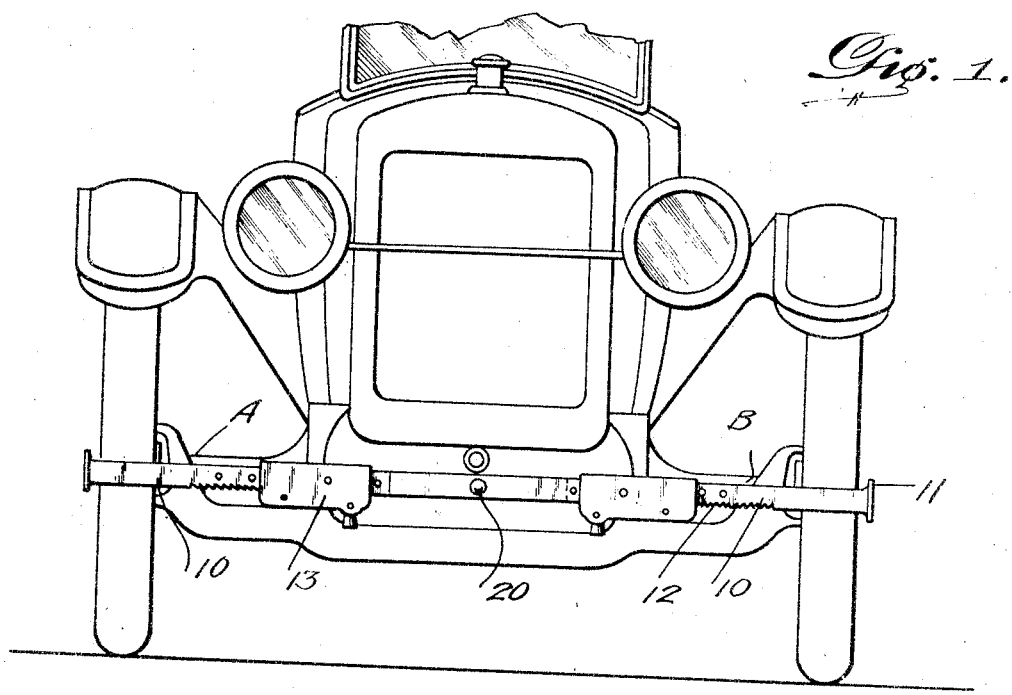
Figure 1 is a front elevation of the device showing the same applied to a motor vehicle for use as a bumper.
Figure 2:
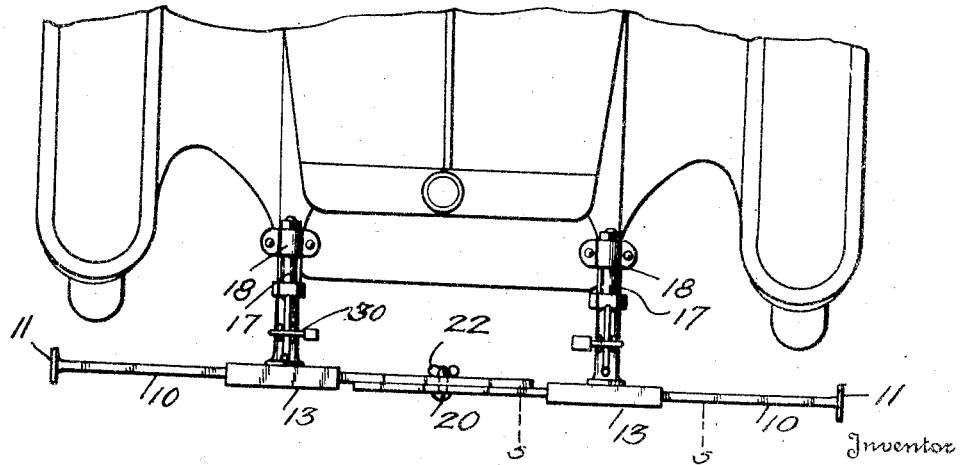
Fig. 2 is a top plan view.

The device forming the subject matter of my invention essentially consists of two identical sections A and B, respectively. Each section embodies an arm 10 provided with a base or ground engaging portion 11 at one end, while one of the longitudinal edges of each arm is provided with rack teeth 12. A slide 13 of substantially U-shaped formation in cross section is fitted upon each arm, while pivoted between the parallel sides of said sleeve is a pawl 14 designed to accommodate a handle 15 by means of which the pawl is actuated in a manner and for the purpose to be presently described. Connecting the parallel sides of each slide with the frame of the car is a sleeve 16 and a rod 17. The rod 17 has one end secured to the frame of the car by means of a clamp 18, the rod being held stationary with respect to the frame, the opposite end of the rod being fitted within the sleeve 16 which is secured to the slide 13. A spring 19 is arranged within the sleeve bearing against one end of the same and the adjacent end of the rod 17. The spring 19 functions to absorb the shock or jar incident to the impact of the bumper with an obstacle as will be readily understood. When the device is used in the capacity of a bumper, the arms 10 of the respective sections are arranged horizontally in overlapped relation and held associated by means of a bolt 20 passed through alined openings 21 in said arms, the bolt accommodating a nut 22. The position of parts for this use is clearly illustrated in Figs. 1 and 2. However, when use of the device as jacks is required, the bolt 20 is removed, and the arms 10, together with the slides 13, are permitted to swing independently into a vertical position. The sleeve 16 of each section is rotatably fitted on the adjacent rod 17 for this purpose. When in this position, the ground engaging element 11 provides a large bearing surface for the jack, while each section affords a suitable jack for each of the forward wheels of the vehicle. It might here be stated that a similar device may also be used at the rear of the machine, in which instance all four wheels of the car may be readily and easily elevated through the instrumentality of the jacks. When the parts are positioned vertically in the manner illustrated in Fig. 3, the handle 15 is associated with the pawl 14 and the latter operated to move the slides 13 upwardly on the fixed arms 10. A pawl 23 is also associated with each slide and coöperates with the teeth 12 of the arms to hold the arms elevated while the pawl 14 is being actuated. The construction and arrangement of parts saves the user considerable time when it is found necessary to jack any of the wheels and is particularly advantageous at night time when changing a tire, as the parts are arranged in front of the lamp of the machine so that the rays from the latter are disposed upon the working parts of the jack. Again, should the car become stuck in mud or sand, the respective jacks may be used to advantage to permit the car to extricate itself under its own power, and can be used to this advantage in places where the ordinary jack could not be placed beneath the car under such conditions.

For the purpose of preventing theft of the car, or its use by unauthorized persons, I provide means for locking the arms in vertical position and the wheels elevated from the ground. In this specific instance I employ an L-shaped locking element 25 which is pivoted between apertured lugs 26 carried by the sleeve 16. The arm 10 of each section is provided with a plurality of openings 27 which when brought into registration with the openings 28 of the slide, receives one end of the locking element 25 as shown in Fig. 4. This is the active position of the locking element and as shown in Fig. 4 the opposite end of said element indicated at 29 passes through the sleeve 16 into a pocket in the rod 17. A padlock or the like 30 is utilized for holding the locking element in active position. The inactive position of the locking element is shown by dotted lines in Fig. 4.

While I have shown and described what I consider the preferred embodiment of the invention, I desire to have it understood that I do not limit myself to the exact details and that such changes may be resorted to when desired as fall within the scope of what is claimed.

What is claimed is:

1. A combined bumper and lifting jack for vehicles, embodying a pair of arms detachably connected together, means for supporting the arms in a horizontal position from the frame or axle of the car for use as a bumper and permitting said arms to be swung independently to a vertical position when separated, and means carried by each arm to permit the use of the same as a jack.

2. A combined bumper and lifting jack for vehicles comprising a pair of arms detachably connected together, means for supporting the arms in horizontal position from the frame of the car for use as a bumper and permitting said arms to be swung independently to a vertical position when separated, means carried by each arm to permit use of the latter as a jack, and means for locking said arms in vertical positions for the purpose specified.

3. A combined bumper and lifting jack for vehicles comprising a pair of arms, means for detachably connecting said arms in horizontal position, means for supporting said arms from the frame of the vehicle to permit the arms to be swung to a vertical position when separated, and lifting mechanism associated with each arm whereby the component parts of the bumper may be converted into jacks.

4. A combined bumper and jack for vehicles comprising a pair of arms detachably connected together, means for supporting the arms in horizontal position from the frame of the vehicle for use as a bumper and permitting said arms to be swung independently to a vertical position when separated, said means including a resilient element interposed between the arms and frame of the vehicle, and means carried by each arm to permit use of the latter as a jack.

5. A combined bumper and jack for vehicles comprising a pair of arms, means for detachably connecting the arms in a horizontal position, a slide mounted on each arm, a pawl and ratchet mechanism for each slide, and means for supporting said arms from the frame of the vehicle whereby said arms may be swung from a horizontal to a vertical position when separated.

6. A combined bumper and jack for vehicles comprising a pair of arms, means for detachably connecting said arms in a horizontal position, a slide for each arm, pawl and ratchet mechanism for each slide, a sleeve carried by each slide, a rod for each sleeve, said rod being fixed to the frame of the car and arranged within the sleeve whereby said arm and slide may be swung from a horizontal to a vertical position when the arms are separated, and a spring interposed between said rod and sleeve.

In testimony whereof I affix my signature.

GUSTAF SJOLANDER.